United States Patent [19]
Cohen et al.

[11] Patent Number: 5,279,035
[45] Date of Patent: Jan. 18, 1994

[54] FRUIT AND VEGETABLE PEELER

[75] Inventors: Milton L. Cohen, Hewlett Bay Park; Jeff Siegel, Great Neck, both of N.Y.

[73] Assignee: Lifetime Hoan Corporation, Brooklyn, N.Y.

[21] Appl. No.: 997,352

[22] Filed: Dec. 28, 1992

[51] Int. Cl.$^5$ .................. B26B 29/00; B26B 1/00; A47J 17/00

[52] U.S. Cl. ..................................... 30/294; 30/338; 99/588

[58] Field of Search ................ 30/338, 280, 294, 314, 30/355; 99/542, 545, 584, 588

[56] References Cited

U.S. PATENT DOCUMENTS

| | | | |
|---|---|---|---|
| 832,736 | 10/1906 | Justus | 30/280 |
| 1,667,596 | 4/1928 | Kapota | 99/588 |
| 1,698,111 | 1/1929 | Terrell | 99/588 |
| 2,266,278 | 12/1941 | Senkewitz | 99/588 |
| 2,274,815 | 3/1942 | Whann | 99/588 |
| 3,859,725 | 1/1975 | Anderson et al. | 30/294 |
| 4,021,912 | 5/1977 | Stanfield | 30/338 |
| 4,569,130 | 2/1986 | Koller et al. | 30/136 |
| 5,014,434 | 5/1991 | Skerker | 30/136 |

*Primary Examiner*—Bruce M. Kisliuk
*Assistant Examiner*—Paul M. Heyrana
*Attorney, Agent, or Firm*—Goodman & Teitelbaum

[57] ABSTRACT

A kitchen utensil for fruits, vegetables and the like, including a tool having a head portion for engaging a fruit, a vegetable and the like, a handle for gripping the tool, and a flexible portion disposed between the head portion and the handle portion for permitting the head portion to pivot relative to the handle. The flexible portion includes a serpentine section having one end thereof integrally connected to the handle, and an opposite end thereof integrally connected to the head portion to provide a one piece integral construction. The serpentine section provides a series of loops, where wedge-shaped reinforcement members are transversely disposed between the loops to maintain the loops in the serpentine configuration. A flexible web portion is provided in each of the loops to maintain the loop configuration thereof while permitting expansion and contraction of the loops under pressure. Preferably, the tool is a fruit and vegetable peeler, where the head portion is provided with a cutting blade extending in the same longitudinal direction as the handle to be in an aligned position therewith. The cutting blade is inwardly curved along its longitudinal length to provide a bow-shaped construction. The flexible portion permits the cutting blade to follow the natural contour of fruits and vegetables so that the cutting blade easily passes over imperfections on the surface of the fruit or vegetable.

20 Claims, 1 Drawing Sheet

FRUIT AND VEGETABLE PEELER

BACKGROUND OF THE INVENTION

The invention relates to a kitchen utensil for fruits, vegetables and the like, and more particularly, to a fruit and vegetable peeler having a cutting blade which is inwardly curved along its longitudinal length, and a flexible portion including a serpentine section disposed between the cutting blade portion and the handle to permit the cutting blade portion to pivot relative to the handle so that the cutting blade can follow the natural contour of the fruits and vegetables and pass over imperfections on the surface of the fruit or vegetable.

Fruit and vegetable peelers are well known in the kitchen utensil art. Many prior art peelers are provided with a curved blade which is secured only at one end to a handle. U.S. Pat. No. 1,452,930 and U.S. Pat. No. 1,794,823 show such a prior art peeler, where U.S. Pat. No. 1,508,628 shows a similar prior art peeler having a bend provided in the blade for insertion into the stem depression of the fruit or vegetable.

U.S. Pat. No. 2,264,196 and U.S. Pat. No. 4,970,786 also discloses a prior art peeler having a curved blade secured only at one end to the handle. However, the blade in these latter patents has two longitudinally extending, spaced apart cutting edges therein.

Accordingly, there is presently a need for a fruit and vegetable peeler that includes a longitudinally curved cutting blade that is secured at both opposite ends thereof, which includes a flexible portion to permit the cutting blade to follow the natural contour of fruits and vegetables and to easily pass over imperfections on the surface of the fruit or vegetable, and which is inexpensive to manufacture and therefore can be sold at a reasonable price.

SUMMARY OF THE INVENTION

It is accordingly an object of the present invention to provide a kitchen utensil for fruits, vegetables and the like, which avoids the problems of the prior art utensils.

Another object of the present invention is to provide a kitchen utensil that includes a flexible portion, which permits the head portion to pivot relative to the handle.

A further object of the present invention is to provide a kitchen utensil as described above, where the flexible portion includes a serpentine section forming a series of loops.

Still another object of the present invention is to provide a kitchen utensil as described above, which is a fruit and vegetable peeler.

Yet another object of the present invention is to provide a fruit and vegetable peeler as described above, which includes a cutting blade extending in the same longitudinal direction as the handle to be in an aligned position therewith.

Still another object of the present invention is to provide a fruit and vegetable peeler as described above, where the cutting blade is inwardly curved along its longitudinal length to provide a bow-shaped construction.

Another object of the present invention is to provide a fruit or vegetable peeler as described above, where the curvature of the cutting blade and the flexible portion permit the cutting blade to follow the natural contour of fruits and vegetables so that the cutting blade easily passes over imperfections on the surface of the fruit or vegetable.

Yet a further object of the present invention is to provide a fruit and vegetable peeler as described above, which is inexpensive to manufacture and can be sold at a reasonable price.

Briefly, in accordance with the present invention, there is provided a kitchen utensil for fruits, vegetables and the like, including a tool having a head portion for engaging a fruit, vegetable and the like, a handle for gripping the tool, and a flexible portion disposed between the head portion and the handle portion for permitting the head portion to pivot relative to the handle. The flexible portion includes a serpentine section providing a series of loops, where wedge-shaped reinforcement means are transversely disposed between the loops to maintain the loops in the serpentine configuration, and a flexible web portion is provided in each of the loops to maintain the loop configuration thereof while permitting expansion and contraction of the loops under pressure.

In the embodiment of the invention, the tool is a fruit and vegetable peeler, where the head portion is provided with a cutting blade extending in the same longitudinal direction as the handle to be in an aligned position therewith, the cutting blade being inwardly curved along its longitudinal length to provide a bow-shaped construction. The longitudinal curvature of the cutting blade and the flexible portion permit the cutting blade to follow the natural contour of fruits and vegetables so that the cutting blade easily passes over imperfections on the surface of the fruit or vegetable.

The handle is provided with transverse grooves to receive the fingers of a user therein. A hole is provided through the handle so that the tool can be hung on a nail, hook or the like when not in use, where one side wall of the hole is tapered inwardly from opposite sides of the handle to provide a small diameter midway through the hole so that the tapered side wall of the hole acts as a pilot to guide the nail, the hook and the like through the hole.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which.

In the various figures of the drawings, like reference character designate like parts.

DESCRIPTION OF THE PREFERRED EMBODIMENT

Figure 1:
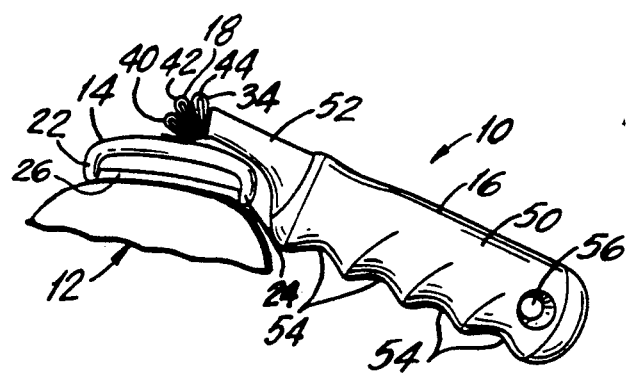
FIG. 1 is a fragmented side elevational view showing a kitchen utensil in the form of a fruit and vegetable peeler being used to peel a fruit or vegetable according to the present invention.

Referring now to the drawings, FIG. 1 shows a kitchen utensil for fruits, vegetables and the like, comprising a tool in the form of a fruit and vegetable peeler 10, which is being used to peel a fruit or vegetable 12 according to the present invention. As shown in FIGS. 1–4, the peeler 10 includes a head portion in the form of a blade holding portion 14, a handle 16 and a flexible portion 18 connecting the blade holding portion 14 to the handle 16. Preferably, the blade holding portion 14, the handle 16 and the flexible portion 18 are fabricated from a plastic material, being connected together in a one piece integral construction.

Figure 4:
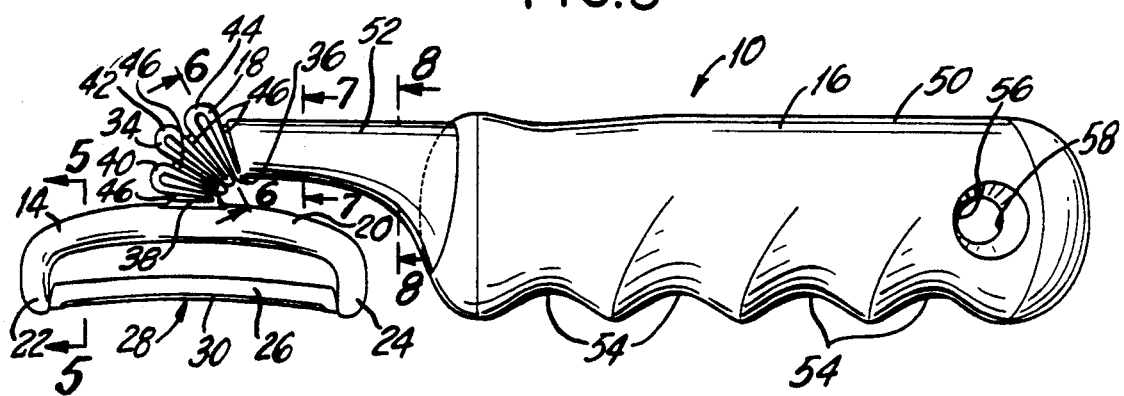
FIG. 4 is a side elevational view of the peeler of FIG. 1 in a normal position.
Figure 5:
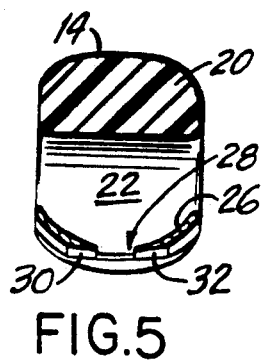
FIG. 5 is an enlarged cross sectional view taken along line 5—5 of FIG. 4.

The blade holding portion 14 extends in the same longitudinal direction as the handle 16 to be in longitudinal alignment therewith. The blade holding portion 14 includes an elongated longitudinally extending body 20 having a substantially oval cross section as shown in FIG. 5. A tab end 22 is curved downwardly from the front portion of the body 20, and an opposing tab end 24 curves downwardly from a rear portion of the body 20, as best shown in FIG. 4. The tab ends 22, 24 are in a spaced apart alignment with each other to position a metal cutting blade 26 therebetween.

As shown in FIG. 4, the cutting blade 26 is inwardly curved, towards the body 20, along its longitudinal length to provide a bow-shaped construction between the tab ends 22, 24. The opposite longitudinal ends of the cutting blade 26 are molded or embedded in the tab ends 22, 24 to fixedly secure the cutting blade 26 to the blade holding portion 14 so that the bow-shaped construction of the blade 26 is maintained. As shown in FIG. 5, the cutting blade 26 has a centrally located, longitudinally extending slot 28, the slot 28 being slightly spaced from both longitudinal ends of the cutting blade 26. As indicated in FIG. 5, the cutting blade 26 is transversely curved or bowed upwardly from opposite sides of the slot 28. Additionally, a cutting edge 30, 32 is provided longitudinally along the cutting blade 26 on both sides of the slot 28. Accordingly, the longitudinal curvature of the cutting blade 26 permits the cutting blade 26 to follow the natural contour of the fruit or vegetable 12, where the peel cut from the fruit or vegetable 12 passes through the slot 28 in a conventional manner well known in the art.

Figure 2:
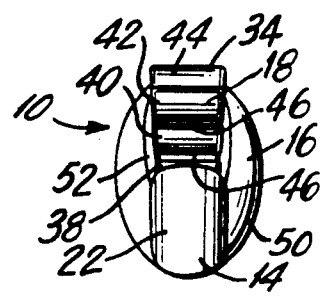
FIG. 2 is a front end view of the peeler shown in FIG. 1.
Figure 3:
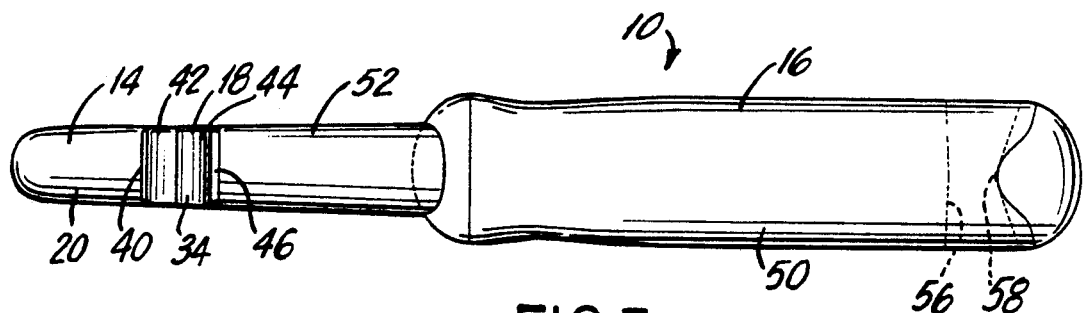
FIG. 3 is a top plan view of the peeler of FIG. 1.

The flexible portion 18 includes a serpentine section 34 having one end 36 integrally connected to the handle 16, and the opposite end 38 integrally connected to a central portion of the body 20 of the blade holding portion 14, as best shown in FIG. 4. The serpentine section 34 forms a series of three loop portions 40, 42 and 44. Wedge-shaped reinforcement members 46 are disposed, in an integral construction, between the loop portions 40, 42, 44, between the loop portion 40 and the body 20, and also between the loop portion 44 and the handle 16 in order to maintain the serpentine configuration thereof. As best shown in FIGS. 2 and 3, the transverse width of the reinforcement members 46 are slightly less than the transverse widths of the loop portions 40, 42, 44.

Figure 6:
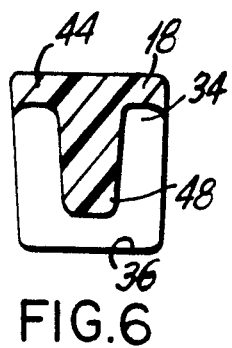
FIG. 6 is an enlarged cross sectional view taken along line 6—6 of FIG. 4.

Additionally, a flexible web portion 48 is provided in each of the loop portions 40, 42, 44 as best shown in FIG. 6, to maintain the loop configurations thereof while allowing the loops to expand or contract under pressure when the peeler 10 is being used, such as shown in FIG. 1. As shown in FIG. 6, the web portions 48 are integrally formed with the loop portions 40, 42, 44, where the transverse width of each web portions 48 is substantially less than the transverse width of each of the loop portions 40, 42, 44, preferably being approximately half the width thereof to provide the flexibility thereto. The flexible portion 18 substantially absorbs the applied force to the handle 16, and distributors a uniform predetermined substantially constant force to the blade holding portion 14 so that a substantially uniform peel of desired thickness is cut from the fruit or vegetable 12. The applied force to the handle 16 is usually varied from time to time by the user thereof, and also is varied from one user to another user thereof, which is corrected as mentioned above.

Accordingly, the flexible portion 18 aids the cutting blade 26 to follow the natural contour of the fruit or vegetable 12, in addition to permitting the cutting blade 26 to pass over imperfections on the surface of the fruit or vegetable 12. Furthermore, as shown in FIG. 1, the flexible portion 18 permits the user to more comfortably position the handle 16 relative to the cutting blade 26, where the handle 16 is permitted to be pivoted closer to the blade holding portion 14 as shown in FIG. 1 or, if desired, the handle 16 can also be pivoted away from the blade holding portion 14, thus providing the user with a more comfortable peeling action.

The handle 16 includes a rear gripping portion 50 and a forward connecting portion 52 secured between the flexible portion 18 and the gripping portion 50. The gripping portion 50 includes a series of transverse grooves 54 in the lower surface thereof to receive the user's fingers therein. A hole 56 is provided through the rear end portion of the gripping portion 50 so that the peeler 10 could be hung on a nail, a hook and the like when not in use. Preferably, one side wall of the hole 56 is tapered inwardly from opposite sides of the gripping portion 50, as shown in FIG. 3, to provide a smaller diameter 58 midway through the hole 56, so that the tapered side wall of the hole 56 acts as a pilot to guide the nail, hook and the like through the hole 56 to facilitate the hanging of the peeler 10.

Figure 7:
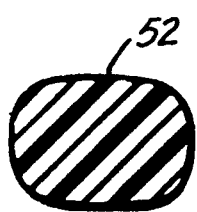
FIG. 7 is an enlarged cross sectional view taken along line 7—7 of FIG. 4.
Figure 8:
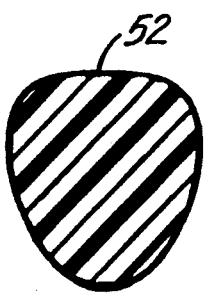
FIG. 8 is an enlarged cross sectional view taken along line 8—8 of FIG. 4.

The connecting 52 portion is tapered inwardly from the gripping portion 50 to the flexible portion 18. As shown in FIG. 8, the connecting portion 52 is substantially egg-shaped, in cross section, adjacent to the gripping portion 50. As shown in FIG. 7, the connecting portion 52 is oval shaped, in cross section, adjacent to the flexible portion 18. The connecting portion 52 provides for a smooth continuous transition between the gripping portion 50 and the flexible portion 18.

Thus, as mentioned above, the unique overall shape of the curved cutting blade 26 and the flexible properties of the flexible portion 18 allow the cutting blade 26 to follow the natural contour of fruits and vegetables, and to easily pass over imperfections on the surface of the fruits and vegetables, as indicated in FIG. 1.

However, the unique features of the flexible portion 18 can be utilized in other kitchen utensils for fruits, vegetables and the like, where the flexible portion would be positioned between the head portion and the handle of the tool. To name a few, the flexible portion 18 can be incorporated into a fruit and vegetable slicer, corer, dicer, grater and the like. Furthermore, a fruit and vegetable cleaning brush can incorporate the flexible section 18 so as not to damage the fruits and vegetables during the cleaning thereof. Accordingly, it would be obvious to one skilled in the kitchen utensil art to incorporate the flexible portion 18 of the present invention in many other types of kitchen tools.

Numerous alterations of the structures herein discussed, and the uses thereof, will suggest themselves to those skilled in the art. However, it is to be understood that the present disclosure relates to a preferred embodiment of the invention, and to a particular use thereof, which is for the purpose of illustration only, and is not to be construed as limitations of the invention.

We claim:

1. A kitchen utensil for fruits and vegetables, comprising:
    a tool including a head portion extending in a longitudinal direction for engaging the fruits and vegetables, a handle also extending in said longitudinal direction for gripping said tool, said head portion and said handle being in longitudinal alignment with each other;
    flexible means disposed between said head portion and said handle for permitting said head portion to pivot relative to said handle in a transverse direction with respect to said longitudinal direction;
    said flexible means including a serpentine section having a series of loops disposed one in front of the other, a first loop being integrally connected to a central portion of said head portion, and a last loop being integrally connected to an end of said handle to provide a one piece integral construction of said head portion, said flexible means and said handle;
    reinforcement means for maintaining said series of loops in a serpentine configuration;
    said head portion including an elongated longitudinally extending body, a first and second tab ends extending transversely outwardly in a downward direction from opposite longitudinal ends of said head portion;
    a longitudinal extending cutting blade; and
    securement means for mounting said cutting blade on said head portion for transverse pivoting with said head portion, said securement means including opposite longitudinal ends of said cutting blade being fixedly secured to said first and second tab ends, respectively, said cutting blade being disposed in a spaced arrangement from said head portion body to provide an empty space between said cutting blade and said head portion body.

2. A kitchen utensil according to claim 1, wherein said reinforcement means includes wedge-shaped members transversely disposed between said loops in an integral construction, each of said loops including a front leg, a rear leg and a bight portion, each of said wedge-shaped members connecting an outer surface of said rear leg of one loop with an outer surface of said front leg of an adjacent loop.

3. A kitchen utensil according to claim 1, wherein a flexible web portion is provided in each of said loops in an integral construction to maintain a loop configuration for each of said loops while permitting expansion and contraction of said loops under pressure, each of said loops including a front leg, a rear leg and a bight portion, said web portion connecting an inner surface of said front leg of each loop to an opposing inner surface of said rear leg of each loop.

4. A kitchen utensil according to claim 1, wherein said handle includes a rear gripping portion and a forward connecting portion integrally secured between said flexible means and said gripping portion.

5. A kitchen utensil according to claim 4, wherein said gripping portion is provided with transverse grooves to receive fingers of a user therein.

6. A kitchen utensil according to claim 5, wherein a hole is provided through said gripping portion so that said tool can be hung on a holding member when not in use.

7. A kitchen utensil according to claim 6, wherein one side wall of said hole is tapered inwardly from opposite sides of said gripping portion to provide a small diameter midway through said hole so that said tapered side wall of said hole acts as a pilot to guide the holding member through the hole.

8. A kitchen utensil according to claim 4, wherein said head portion includes a front part and a rear part, said rear part being disposed below said connecting portion of said handle.

9. A kitchen utensil according to claim 8, wherein said connecting portion is tapered inwardly from said gripping portion to said flexible means to permit said rear part of said head portion to pivot upwardly towards said connecting portion.

10. A kitchen utensil according to claim 9, wherein said connecting portion is egg-shaped in cross section adjacent to said gripping portion, and is oval-shaped adjacent to said flexible means.

11. A kitchen utensil according to claim 1, wherein said cutting blade is inwardly curved along its longitudinal length to provide a bow-shaped construction.

12. A kitchen utensil according to claim 11, wherein said cutting blade has a centrally located, longitudinally extending slot therethrough, said cutting blade being transversely curved upwardly from opposite sides of said slot, and a cutting edge being provided longitudinally along said cutting blade on both sides of said slot.

13. A kitchen utensil according to claim 12, wherein said handle includes a rear gripping portion and a forward connecting portion integrally secured between said flexible means and said gripping portion.

14. A kitchen utensil according to claim 13, wherein said gripping portion is provided with transverse grooves to receive fingers of a user therein.

15. A kitchen utensil according to claim 14, wherein a hole is provided through said gripping portion so that said peeler can be hung on a holding member when not in use, one side wall of said hole being tapered inwardly from opposite sides of said gripping portion to provide a small diameter midway through said hole so that said tapered side wall of said hole acts as a pilot to guide the holding member through the hole.

16. A kitchen utensil according to claim 13, wherein said head portion includes a front part and a rear part, said rear part being disposed below said connecting portion of said handle, said connecting portion being tapered inwardly from said gripping portion to said flexible means to permit said rear part of said head portion to pivot upwardly towards said connecting portion, said connecting portion being egg-shaped in cross section adjacent to said gripping portion, and being oval-shaped adjacent to said flexible means.

17. A kitchen utensil according to claim 12, wherein said reinforcement means includes wedge-shaped members transversely disposed between said loops in an integral construction, each of said loops including a front leg, a rear leg and a bight portion, each of said wedge-shaped members connecting an outer surface of said rear leg of one loop with an outer surface of said front leg of an adjacent loop.

18. A kitchen utensil according to claim 12, wherein a flexible web portion is provided in each of said loops in an integral construction to maintain a loop configuration for each of said loops while permitting expansion and contraction of said loops under pressure, each of said loops including a front leg, a rear leg and a bight portion, said web portion connecting an inner surface of said front leg of each loop to an opposing inner surface of said rear leg of each loop.

19. A kitchen utensil according to claim 1, wherein said one piece integral construction of said head portion, said flexible means and said handle is fabricated from a plastic material.

20. A kitchen utensil according to claim 11, wherein said opposite longitudinal ends of said cutting blade are embedded in said first and second tab ends of said head portion, respectively, to maintain said bow-shaped construction.

* * * * *